Figure 1:
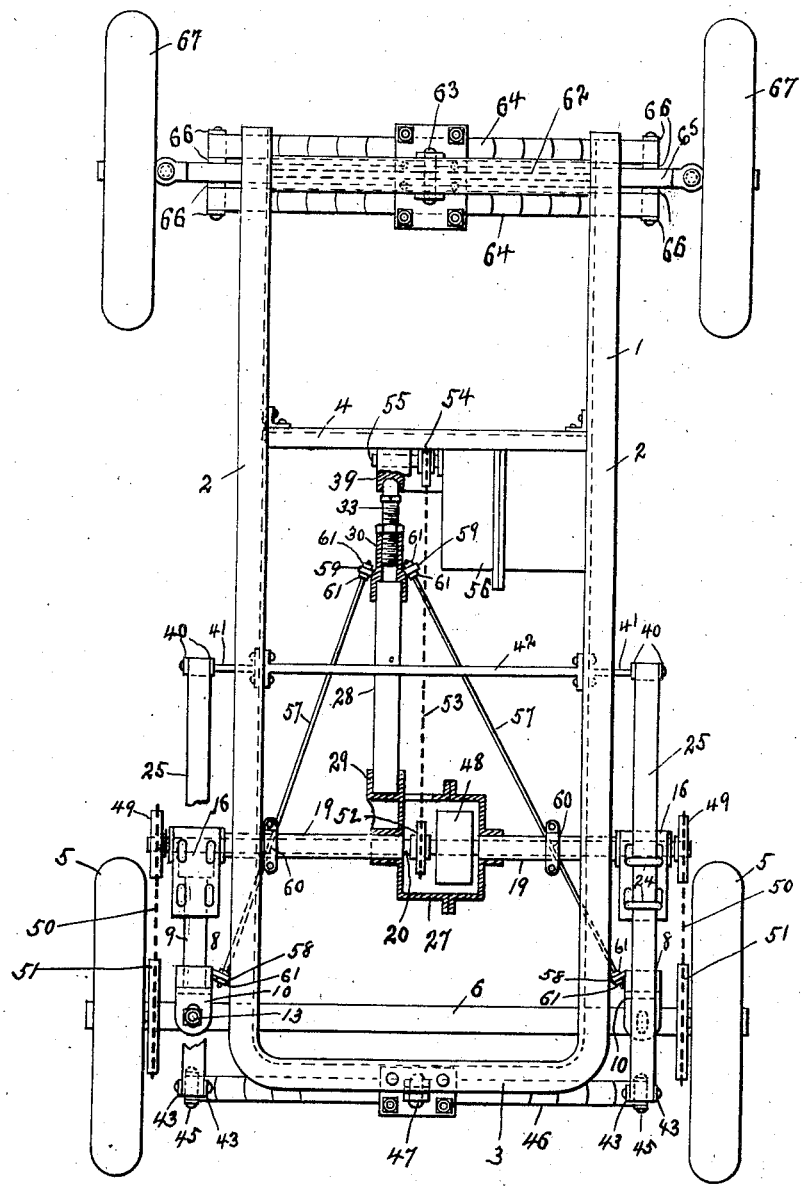

No. 842,591. PATENTED JAN. 29, 1907.
R. P. THOMPSON & E. KOEB.
AUTOMOBILE.
APPLICATION FILED OCT. 16, 1905.

3 SHEETS—SHEET 1.

WITNESSES:
William F. Bauer
Irvine Miller

INVENTORS
Ralph P Thompson.
Emil Koeb.
BY
ATTORNEY

No. 842,591. PATENTED JAN. 29, 1907.
R. P. THOMPSON & E. KOEB.
AUTOMOBILE.
APPLICATION FILED OCT. 16, 1905.
3 SHEETS—SHEET 2.
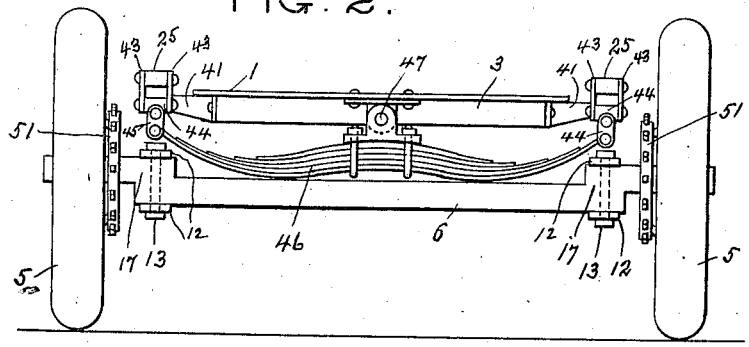
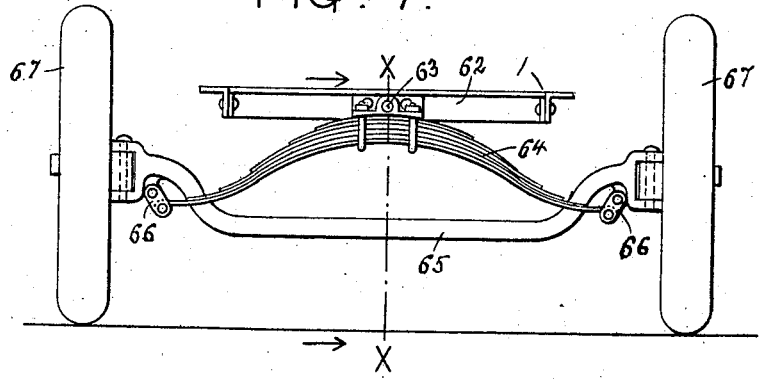
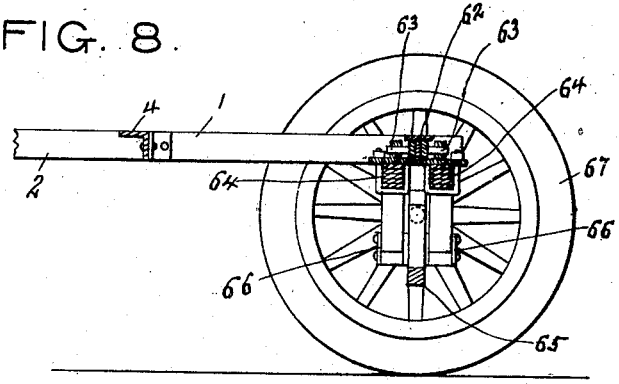
WITNESSES:
William F. Bauer
Irvine Miller
INVENTORS
Ralph P. Thompson
Emil Koeb.
BY
ATTORNEY.

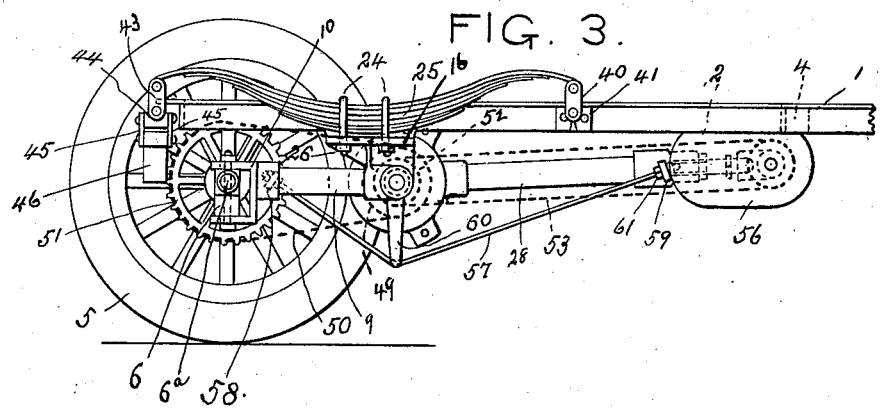

UNITED STATES PATENT OFFICE.

RALPH P. THOMPSON AND EMIL KOEB, OF SPRINGFIELD, OHIO.

AUTOMOBILE.

No. 842,591.      Specification of Letters Patent.      Patented Jan. 29, 1907.

Application filed October 16, 1905. Serial No. 282,891.

*To all whom it may concern:*

Be it known that we, RALPH P. THOMPSON and EMIL KOEB, citizens of the United States, residing at Springfield, in the county of Clark and State of Ohio, have invented certain new and useful Improvements in Automobiles, of which the following is a specification, reference being had therein to the accompanying drawings.

This invention relates to automobiles, and more particularly to the connections between the main frame of the vehicle and the supporting ground-wheels, whereby it is driven and steered, the chief objects of the invention being to provide a spring-supporting mechanism between said frame and the axles of the said wheels which will firmly and evenly support the frame and at the same time permit the front and rear axles to turn independently about an axis transverse to said axles and longitudinal with respect to the machine to permit the wheels to accommodate themselves to inequalities of the roadway while transmitting a minimum of their vibrations to the main frame to render the vehicle more easy riding.

A further object of our invention is to provide means for reducing to a minimum the effect of the vertical vibrations of the rear or driving wheels upon the rear portion of the main frame.

A still further object of our invention is to provide an improved spring connection between the front axle and the front portion of the main frame whereby the relations of the parts may be better maintained, while greater freedom of movement of the front axle is obtained to better adapt it to inequalities of the road.

To these and other ends our invention consists in certain novel features which we will now proceed to describe and will then particularly point out in the claims.

In the accompanying drawings, Figure 1 is a plan view, partly in section and partly broken away, of an automobile embodying our invention in one form, only so much of the vehicle being shown as is necessary to a proper comprehension thereof. Fig. 2 is a rear elevation of the same, showing the rear spring connections, all of the parts forward of the rear axle being omitted. Fig. 3 is a side-elevation of the rear portion of the structure, the driving-wheel and sprocket-gearing being omitted on the side nearest the observer. Fig. 4 is an enlarged detail sectional view of the front member of the supplemental frame and its bearing. Fig. 5 is a detail plan view of one of the members of the supplemental frame serving to connect the rear axle and counter-shaft bearing, portions of which are shown in connection therewith. Fig. 6 is a side elevation of what is shown in Fig. 5. Fig. 7 is a front elevation of the structure, showing the front spring construction, the remaining parts being omitted; and Fig. 8 is a sectional view taken on the line *x x* of Fig. 7 and looking in the direction of the arrows.

In the said drawings, 1 indicates the main frame of a motor-vehicle, which is shown as composed of two parallel longitudinally-extending members 2 and a transverse member 3 at the rear of the machine formed from a single angle-bar suitably bent to shape; but it may be constructed in any approved manner. A cross-bar or transverse member 4, located some distance forward from the rear of the frame, serves as a support for certain parts, to be hereinafter referred to. The driving-wheels, located at the rear of the machine, are indicated at 5 and are mounted to revolve freely upon the ends of the rear axle 6. This latter may be of any suitable construction; but we prefer that shown, in which said axle is formed in a single piece, square in cross-section, except for the spindles 6ª at its ends, which latter are elevated somewhat above the body of the axle by offset portions 7. Between the rear axle and main frame we locate a supplemental frame, pivoted to the main frame at its forward end at a point well forward on the main frame, secured to the rear axle at its rear end, provided with springs which support the rear portion of the main frame upon the rear axle, and preferably carrying a counter-shaft which intervenes between the main driving-shaft and the driving-wheels at the rear of the machine. The construction of this supplemental frame which we prefer is one which we have devised and which is illustrated in the accompanying drawings. This comprises two longitudinally-extending members, one on each side of the main frame, secured to the rear axle at their rear ends and connected at their front ends to the counter-shaft bearing. One of these members is shown in detail in Figs. 5 and 6 of the drawings, while they are indicated as a whole in Figs. 1 and 3 by the reference-numeral 8. As shown in Figs. 5 and 6, each of these members comprises a body portion 9, preferably tubular in form. Said body portion is provided at its rear end with a bracket 10, having a socket 11 to receive the end of the body member 9 and flanges 12, which fit above and below the rear axle 6. We prefer to so locate these parts that the offset portions 7 of the rear axle are received between the flanges 12, thus greatly increasing the vertical strength of the axle at the points where the frame members 8 are secured thereto. This securing is effected on each side of the machine by means of a bolt 13, passing through slots 14 in the flanges 12 and through a suitable aperture in the offset portion 7 of the axle, said bolt being provided with a nut 15 on its upper end. The slots 14 extend longitudinally of the frame members 8, so that an adjustment of these members relatively to the rear axle may be effected to bring their forward ends nearer to or farther from said axle, for the purpose hereinafter set forth. Each member 8 has mounted upon its forward end a bracket 16, having a socket 17 to receive the forward end of the body 9. On its inner side said bracket 16 is provided with a socket 18 to receive the end of the bearing-sleeve 19 of the counter-shaft 20, an aperture 21 being also formed in said bracket for the passage of said counter-shaft, which extends outward beyond said bracket. Each bracket 16 is also provided on its upper side with a bed plate or table 22, having slots 23 extending longitudinally with respect to the member 8. These slots serve to receive U-bolts 24, which secure upon the bed or table 22 the central portion of a spring 25, there being two of these springs employed, one on each side of the main frame 1. The U-bolts 24 are provided with nuts 26, located on the ends of said bolts which project below the end of the table 22, so that the springs 25 may be clamped upon said table or plate and may be adjusted longitudinally thereon for the purposes hereinafter set forth.

As shown in the present instance, the bearing-sleeve 19 of the counter-shaft 20 is formed in two parts connected to an intermediate casing 27, to be hereinafter more particularly referred to, said sleeve and casing constituting a part of the supplemental frame, as practically does also the counter-shaft mounted therein. The main or body portion of said supplemental frame also comprises a longitudinally-extending member 28, located in an approximately central position with respect to the machine and having its rear end secured in a socket 29, supported on or forming a part of the casing 27. This longitudinally-extending member 28 is preferably tubular in form in so far as its body portion is concerned, its forward end being constructed in a manner shown more particularly in detail in Fig. 4 of the drawings. Said body portion has secured thereon a sleeve 30, the rear end of which has a socket 31, in which the front end of the body portion fits. The front end of the sleeve is threaded, as indicated at 32, to receive the correspondingly-threaded rear end of a bearing-post 33, which may be rotated therein by means of a suitable wrench-grasp 34, formed thereon, so as to cause said bearing-post to project forward from the sleeve 30 to a greater or less extent, as desired. A lock-nut 35, mounted on the threaded portion of the bearing-post and bearing against the front end of the sleeve serves to secure the parts in position after adjustment. The front end of the bearing-post is rounded off into a hemispherical or otherwise suitably-curved surface 36 and rests within a correspondingly-curved socket 37, having a flaring mouth 38 to permit the bearing-post to rock therein in a vertical plane and also to rotate therein around its longitudinal axis. The socket 37 is formed in a block or casting 39, secured to the transverse frame member 4, hereinbefore referred to, and by this means the front end of the auxiliary supplemental frame is so supported that the rear end of said frame may move vertically relatively to the main frame 1, while the entire supplemental frame may turn around an axis extending in the direction of the length of the vehicle.

The springs 25 are connected to and support the rear end of the main frame. The front ends of the springs 25 are connected by links 40 to brackets 41, mounted on the outer sides of the longitudinally-extending side frame members 2, a cross-brace 42 being preferably inserted between said side members at the point where the brackets are located. The rear ends of the springs 25 are connected by links 43 to a coupling 44, which latter is connected by links 45 with the ends of a spring 46, extending transversely of the machine at the rear of the main frame 1. The spring 46 has its central portion pivotally connected to the central portion of the rear cross-bar 3 of the main frame, as indicated at 47, the pivot extending in a direction longitudinally of the machine, so that the spring 46 may rock or tilt transversely of the machine in conjunction with the rear axle 6 and the supplemental frame.

As has already been stated, the counter-shaft 20 is mounted in the supplemental frame, of which it, through its bearing-sleeve 19, practically forms a part, so that it moves in unison with said supplemental frame. The casing 27 serves to inclose a compensating gear 48, by means of which the sprocket-wheels 49 on the ends of the counter-shaft 20 are permitted to rotate at different speeds in turning curves, &c. Said sprocket-wheels 49 are connected by sprocket-chains 50 (indicated in dotted lines in Fig. 3) with sprocket-wheels 51, so connected to the driving-wheels 5 as to move in unison therewith. The casing 27 also serves to inclose a sprocket-wheel 52, driven by a sprocket-chain 53, (shown in dotted lines in Fig. 3,) which sprocket-chain receives its motion from a sprocket-wheel 54, mounted on the driving-shaft 55. This latter is shown as having a bearing in the block or casting 39, in which the socket 37 is formed. 56 indicates a gear-casing inclosing a gearing by which the speed and direction of the shaft 55 may be controlled.

In order to strengthen and brace the supplemental frame, we employ truss-rods 57. These rods have their rear ends secured to lugs 58, formed on the brackets 10, while their forward ends are secured to lugs 59 formed on the sleeve 30. Their intermediate portions are deflected downward, so as to pass under struts 60, secured to the bearing-sleeve 19 and extending downward therefrom. The truss-rods 57 are tensioned by means of nuts 61, mounted on their threaded ends on opposite sides of the lugs 58 and 59.

From an examination of the construction just described it will be seen that the supplemental frame, which carries the rear axle and its wheels, is so connected to the main frame that it may turn around a longitudinal axis in case either of the driving-wheels strikes an obstruction or inequality which causes it to move upward or downward independently of the other driving-wheel, this motion of the supplemental frame being such that the main frame will practically maintain its normal position, being little affected by the lateral rocking of the supplemental frame, thus causing the main frame, which carries the body in which the passengers are seated, to ride smoothly and practically free from lateral rocking arising from the cause indicated. This action is materially facilitated by the pivoting of the transverse spring 46 to the rear end of the main frame, since it prevents any torsional effect from being transmitted to the main frame through said spring. The construction is further advantageous in reducing to a minimum the vertical vibrations of the rear end of the main frame arising, for instance, when both of the rear wheels simultaneously encounter an elevation or depression in the roadway, for it will be seen that the springs are not interposed directly between the rear axle and the main frame, but are interposed between the supplemental frame and main frame at a point forward of the rear axle and nearer to the pivotal point of said supplemental frame at its forward end. Any vertical movement of the rear axle is transmitted to the spring to a diminished extent, for the reason that the points of the supplemental frame to which the springs are connected lying nearer to the pivotal connection of the supplemental frame than does the axle must move vertically to an extent less than the vertical movement of the axle, the difference being proportionate to the relation which the distance separating the rear axle and pivotal point of the supplemental frame bears to the distance between the rear axle and points of connection of the springs to the supplemental frame. By reason of this construction the vertical vibrations of the rear end of the main frame are very much reduced, and this is of material importance in connection with automobiles as now constructed, in which the rear seat usually overhangs the rear end of the frame to an extent such that the vertical movement is intensified at that part of the body where the rear seats are located. It should be noted in this connection that by the employment of a supplemental frame pivoted to the main frame and carrying the rear wheels and axle, these latter move in prescribed paths, although free to rock and move vertically as conditions may require, and we are thus enabled to properly maintain the relations between the main frame and the driving-wheels and their axle much more accurately than is the case where the springs form the sole connections between the axle and main frame, and by our construction the springs are relieved from the severe strains which they receive when located between and connected directly to said axle and frame, so as to thus form the sole and direct connections between them.

It will be understood that the slotting of the brackets 10 and 16 longitudinally of the machine and the provision for adjusting the bearing-post 33 longitudinally with respect to the remainder of the supplemental frame serve in an obvious manner to properly regulate the distances separating the sprocket-wheels of the chain-drive, and thereby provide means for properly adjusting the tension of the sprocket-chains through which the rear wheels are driven. The mounting of the counter-shaft on the supplemental frame maintains proper driving relations between the various sprocket-wheels and chains irrespective of the vertical and lateral vibrations of the supplemental frame. It will be noted in this connection that the sprocket-wheel 44 is located so near the pivotal center of the supplemental frame that the variations in distance between it and the sprocket-wheel arising from the vertical movements of the supplemental frame are so small as to be negligible, and the two sprocket-wheels are located practically in line with the longitudinal axis around which the supplemental frame turns in its lateral rocking movement, so that the variations in distance between said sprocket-wheels arising from this latter movement are also so slight as to be immaterial.

Having thus fully described the connections between the rear wheels and axle and the main frame, we will now describe the connections between the front wheels and their axle and the main frame.

The main frame is provided at its front end with a transverse member 62, to which are connected by a central longitudinal pivot 63 two springs 64. These springs are connected to the main frame at their central upwardly-arched portions and extend thence laterally outward and downward in both directions. They are spaced apart sufficiently to receive between them the front axle 65, to the ends of which the ends of the springs are connected in any suitable manner—as, for instance, by means of links 66. The steering ground-wheels (indicated at 67) are mounted on the ends of the front axle by means of the usual knuckle connections and are provided with any suitable controlling mechanism, preferably that set forth in an application filed by us of even date herewith. It will be noted that the connection of the front axle 65 with the main frame is through the transverse front springs and their pivot, so that said front axle is free to rock or tilt laterally when either wheel encounters an obstruction or inequality of the road without transmitting any torsional strain to the front end of the main frame which would tend to lift one side or the other of said main frame. It will further be noted that the axle is located between the two transverse springs in such a way that the relations between the axle and springs are always properly maintained. Finally, it should be noted that the longitudinal pivotal axis 63 of the front transverse spring is in alinement with the longitudinal pivotal axis 47 of the rear transverse spring, so that the main frame is practically supported upon alined central longitudinal pivots both at its front and rear ends, upon which pivots it is free to move so as to maintain its horizontality, such movements being restrained and regulated, however, by the connection to the sides of said main frame of the forward ends of the longitudinally-arranged springs 25 at the rear of the machine. We have found from actual practical tests that this construction gives an easy-riding and well-balanced frame, which will maintain its normal plane against disturbing influences of a most serious character and is therefore particularly adapted for use in connection with rough roads.

We do not wish to be understood as limiting ourselves to the precise details of construction hereinbefore described and shown in the accompanying drawings, as it is obvious that these details may be modified without departing from the principle of our invention.

Having thus fully described our invention, what we claim as new, and desire to secure by Letters Patent, is—

1. In an automobile, the combination, with a main frame, of a supplemental frame located beneath the rear portion thereof and pivotally connected thereto at its forward end so that its rear end may move vertically, a rear axle provided with ground-wheels and connected to said supplemental frame at the rear end thereof, and a spring connected at its ends with the main frame and at an intermediate point with the supplemental frame, substantially as described.

2. In an automobile, the combination, with a main frame, of a supplemental frame located beneath the rear portion thereof and pivotally connected thereto at its forward end so that its rear end may move vertically, a rear axle provided with ground-wheels and connected to said supplemental frame at the rear end thereof, and a spring interposed between said supplemental frame and main frame, said spring being connected at a point between its ends to the supplemental frame and having its opposite ends connected with the main frame, substantially as described.

3. In an automobile, the combination, with a main frame, of a supplemental frame located beneath the rear portion thereof and pivotally connected thereto at its forward end so that its rear end may move vertically, a rear axle provided with ground-wheels and connected to said supplemental frame at its rear end, and springs interposed between said supplemental and main frames and connected at points between their ends to the supplemental frame and connected at their opposite ends with the main frame, substantially as described.

4. In an automobile, the combination, with a main frame, of a supplemental frame located beneath the rear portion thereof and pivoted thereto at its forward end so that its rear end may move vertically, a rear axle provided with ground-wheels and connected to the supplemental frame at its rear end, longitudinally-extending springs connected between their ends to points on the supplemental frame between the rear axle and the front end of said supplemental frame, said springs having their front ends connected to the main frame, and a transverse spring connected between its ends to the rear of the main frame and having its ends connected to the rear ends of the longitudinal springs, substantially as described.

5. In an automobile, the combination, with a main frame, of a supplemental frame located beneath the rear portion thereof and pivotally connected thereto at its forward end so as to be capable of vertical movement at its rear end and also capable of rocking laterally around a longitudinal axis, a rear axle provided with ground-wheels and connected to said supplemental frame at the rear end thereof, and a spring connected at its opposite ends with the main frame and at an intermediate point with the supplemental frame, substantially as described.

6. In an automobile, the combination, with a main frame, of a supplemental frame located beneath the rear portion thereof and pivotally connected thereto at its forward end so as to be capable of vertical movement at its rear end and also capable of rocking laterally around a longitudinal axis, a rear axle provided with ground-wheels and connected to said supplemental frame at the rear end thereof, and longitudinally-extending springs supporting the main frame and connected to the supplemental frame, substantially as described.

7. In an automobile, the combination, with a main frame, of a supplemental frame located beneath the rear portion thereof and pivotally connected thereto at its front end so as to be capable of vertical movement at its rear end and also capable of rocking laterally around a longitudinal axis, a rear axle provided with ground-wheels and connected to said supplemental frame at the rear end thereof, longitudinally-extending springs connected between their ends to said supplemental frame at points between the rear axle and front end of said supplemental frame, said springs having their front ends connected to the main frame, and a transverse spring connected to the rear end of the main frame and having its ends connected to the rear ends of the longitudinal springs, substantially as described.

8. In an automobile, the combination, with a main frame, of a supplemental frame located beneath the rear portion thereof and pivotally connected thereto at its front end so as to be capable of vertical movement at its rear end and also capable of rocking laterally around a longitudinal axis, a rear axle provided with ground-wheels and connected to said supplemental frame at the rear end thereof, longitudinally-extending springs connected between their ends to said supplemental frame, said springs having their front ends connected to the main frame, and a transverse spring connected to the rear end of the main frame and having its ends connected to the rear ends of the longitudinal springs, the connection between said transverse spring and main frame being a pivotal one around a longitudinal axis, substantially as described.

9. In an automobile, the combination, with a main frame, of a supplemental frame located beneath the rear portion thereof and pivotally connected thereto at its forward end, a rear axle provided with ground-wheels and connected to the rear end of said supplemental frame, springs interposed between said supplemental and main frames, a counter-shaft mounted on said supplemental frame, a driving-shaft on the main frame, and driving connections between said driving-shaft, counter-shaft and ground-wheels, substantially as described.

10. In an automobile, the combination, with a main frame, of a supplemental frame located beneath the rear portion thereof and pivotally connected thereto at its forward end so as to be capable of vertical and laterally rocking movements, a rear axle provided with ground-wheels and connected to the rear end of said supplemental frame, springs interposed between said supplemental and main frames, a counter-shaft mounted on said supplemental frame, a driving-shaft on the main frame, and driving connections between said driving-shaft, counter-shaft and ground-wheels, substantially as described.

11. In an automobile structure of the character described, the combination, with a main frame, and a rear axle having ground-wheels, of a supplemental frame located beneath the rear portion of the main frame, and springs interposed between said frames, said supplemental frame comprising a transverse member, a longitudinal member extending forward from said transverse member and bearing on the main frame, and two longitudinal members extending rearwardly from the transverse member and connected to the axle at their rear ends, substantially as described.

12. In an automobile, the combination, with a main frame, a supplemental frame located beneath the rear portion thereof, and springs interposed between said frames, said supplemental frame comprising a transverse member consisting of a counter-shaft bearing-sleeve and a casing for the counter-shaft gearing, a forwardly-extending member of adjustable length having a bearing on the main frame, rearwardly-extending members, an axle mounted in said rearwardly-extending members and provided with ground-wheels, means for adjusting the relations between said axle and transverse member, a driving-shaft on the main frame, and a counter-shaft mounted in the bearing-sleeve, the driving-shaft, counter-shaft and ground-wheels being provided with sprocket-wheels, and sprocket-chains connecting the same, substantially as described.

13. In an automobile structure of the character described, a supplemental frame comprising a transverse member consisting of a bearing-sleeve and gear-casing provided with a socket, a forwardly-extending member mounted in said socket, rearwardly-extending members connected to the ends of said sleeve and adapted to receive the rear axle at their rear ends, truss-rods connecting the rear ends of said rearwardly-extending members and the front end of the forwardly-extending member, and struts extending downward from the transverse member and bearing on said truss-rods, substantially as described.

14. In an automobile structure of the character described, the combination, with a main frame having a bearing-socket, of a supplemental frame located beneath the main frame, and springs interposed between said frames, said supplemental frame being provided at its forward end with a sleeve, and a thrust-post adjustable longitudinally in said sleeve and having its forward end rounded to fit the bearing-socket of the main frame and pivot axially and vertically therein, substantially as described.

15. In an automobile structure of the character described, an axle provided with ground-wheels and having its end portions vertically offset and its central portion depressed, in combination with a frame carrying said axle, said frame being provided with flanges embracing the axle above and below its offset portions, and securing-bolts passing through said offset portions, substantially as described.

16. In an automobile, the combination, with a main frame, and front and rear axles beneath said frame and separate therefrom and provided with ground-wheels, of front and rear transversely-arranged springs supporting said main frame upon said axles and connected to said main frame by longitudinal pivots, substantially as described.

17. In an automobile, the combination, with a main frame, and front and rear axles beneath said frame and separate therefrom and provided with ground-wheels, of front and rear transversely-arranged springs supporting said main frame upon said axles and connected to said main frame by longitudinal pivots, said pivots being alined, substantially as described.

18. In an automobile, the combination, with a main frame, and front and rear axles provided with ground-wheels, of a transversely-arranged spring connected to the front axle and pivotally connected to the front of the main frame by a longitudinal pivot, a transversely-arranged rear spring connected to the rear of the main frame by a longitudinally-arranged pivot, and longitudinally-arranged springs having their rear ends connected to the rear transverse spring, their front ends connected to the main frame, and a supplemental frame connecting their intermediate portions with the rear axle, substantially as described.

19. In an automobile, the combination, with a main frame, and front and rear axles provided with ground-wheels, of a transversely-arranged spring connected to the front axle and pivotally connected to the front of the main frame by a longitudinal pivot, a transversely-arranged rear spring connected to the rear of the main frame by a longitudinally-arranged pivot, and longitudinally-arranged springs having their rear ends connected to the rear transverse spring, their front ends connected to the main frame, and a supplemental frame connecting their intermediate portions with the rear axle, the pivotal axes of said front and rear transverse springs being in alinement, substantially as described.

In testimony whereof we affix our signatures in presence of two witnesses.

RALPH P. THOMPSON.
EMIL KOEB.

Witnesses:
IRVINE MILLER,
T. J. McCORMICK.